US007011766B1

(12) United States Patent
Hull

(10) Patent No.: US 7,011,766 B1
(45) Date of Patent: Mar. 14, 2006

(54) CAPPING AND TREATING A METAL-CONTAMINATED SEDIMENT

(75) Inventor: John H. Hull, Toledo, OH (US)

(73) Assignee: Aquablok, Ltd., Toledo, OH (US)

( * ) Notice: Subject to any disclaimer, the term of this patent is extended or adjusted under 35 U.S.C. 154(b) by 0 days.

(21) Appl. No.: 10/808,095

(22) Filed: Mar. 24, 2004

Related U.S. Application Data

(60) Provisional application No. 60/457,454, filed on Mar. 25, 2003.

(51) Int. Cl.

| | |
|---|---|
| ***B32B 5/16*** | (2006.01) |
| ***B09C 1/08*** | (2006.01) |
| ***E02B 3/12*** | (2006.01) |
| ***C09K 3/22*** | (2006.01) |

(52) U.S. Cl. .................... 252/88.2; 252/88.1; 405/268; 405/107; 405/128.15; 428/403; 428/323

(58) Field of Classification Search ............... 252/88.1, 252/88.2; 428/403, 323; 405/268, 107, 405/128.5
See application file for complete search history.

(56) References Cited

U.S. PATENT DOCUMENTS

| | | | | |
|---|---|---|---|---|
| 5,538,787 | A * | 7/1996 | Nachtman et al. | 428/323 |
| 5,897,946 | A * | 4/1999 | Nachtman et al. | 428/323 |
| 6,386,796 | B1 * | 5/2002 | Hull | 405/128.25 |
| 6,558,081 | B1 | 5/2003 | Hull | 405/157 |

OTHER PUBLICATIONS

"Contaminated Sediments in Ports and Waterways", Marine Board, National Research zzCouncil, Report, 1997, pp. 97-99.*

"Regional Geochemistry of Metals in Organic-Rich Sediments, Sawgrass and Surface Water, from Taylor Slough, Florida", USGS, OFR-00-327, 2002, pp. 1-5.*

"Plaster of Paris", Data Sheet-1, Encyclopedia of Britannica, 2005.*

"Contaminated Sediments in Ports and Waterways, Cleanup Stragegies and Technologies", Marine Board, National Research Council, pp. 97-99. (1997).

"Regional Geochemistry of Metals in Organic-Rich Sediments, Sawgrass and Surface Water, from Taylor Slough, Florida", U.S. Department of the Interior, USGS, OFR-00-327, pp. 1-5 (2002).

"Immobilization of Cobalt by Sulfate-Reducing Bacteria in Subsurface Sediments", Krumholz et al., published in Geomicrobiology Journal, vol. 20, No. 1/Jan.-Feb., 2003, pp. 61-72 (Abstract provided).

* cited by examiner

*Primary Examiner*—Mark Kopec
*Assistant Examiner*—Kallambella Vijayakumar
(74) *Attorney, Agent, or Firm*—MacMillan, Sobanski & Todd, LLC

(57) ABSTRACT

A method of treating a metal-contaminated sediment includes capping the sediment with a capping product containing sulfur and at least one component selected from the group consisting of clays, clay-sized materials, bulking agents, sand, sand-sized materials, aggregate, and binding agents. A capping product includes a plurality of manufactured composite particles, each composite particle comprising a relatively dense core and a sealant layer at least partially encapsulating the core, the sealant layer including sulfur and at least one of the above components.

5 Claims, No Drawings

CAPPING AND TREATING A METAL-CONTAMINATED SEDIMENT

CROSS-REFERENCE TO RELATED APPLICATION

This application claims the benefit of U.S. provisional application Ser. No. 60/457,454 filed on Mar. 25, 2003.

BACKGROUND OF THE INVENTION

The invention relates in general to methods of treating contaminated sediments, and in particular to the treatment of metal-contaminated sediments.

Significant numbers of sediments in deepwater, wetland, and dry land environments are contaminated with various metals. For example, metals which are introduced by one means or another into lakes, marshes, river beds and ocean areas near coastlines, settle on the bottoms of such bodies of water and become attached to sediments. The metal-contaminated sediments are detrimental to the ecosystem, especially wildlife which utilizes the body of water, such as fish, foraging waterfowl and small vertebrates and invertebrates.

One method of treating metal-contaminated marine sediments in situ is disclosed in "Contaminated Sediments in Ports and Waterways, Cleanup Stragegies and Technologies", Marine Board, National Research Council, pages 97–99 (1997). Sulfides or elemental sulfur are used to promote the formation of metal sulfides, which have low solubility in water and therefore tend to form precipitates.

"Regional Geochemistry of Metals in Organic-Rich Sediments, Sawgrass and Surface Water, from Taylor Slough, Fla.", U.S. Department of the Interior, USGS, OFR-00-327, pages 1–5 (2002), discloses that sulfur plays an important role in the sequestration of metals in sedimentary systems. Under anoxic (chemically reduced) conditions, microbial sulfate reduction reduces sulfate to sulfide. It is described that sulfide is a highly reactive chemical species, especially with metal ions, and will quickly form highly insoluble metal sulfides.

"Immobilization of Cobalt by Sulfate-Reducing Bacteria in Subsurface Sediments", Krumholz et al., published in Geomicrobiology Journal, Volume 20, No. 1/Jan–Feb, 2003, pages 61–72, discloses that an increase in the amount of cobalt ($Co^{2+}$) immobilized as CoS was observed as sulfate reduction activity was stimulated in flow-through columns.

Although the current treatment methods are somewhat effective, there is still a need for an improved method of treating metal-contaminated sediments.

SUMMARY OF THE INVENTION

The present invention relates to a method of treating a metal-contaminated sediment. The method comprises capping the sediment with a capping product containing sulfur and at least one component selected from the group consisting of clays, clay-sized materials, bulking agents, sand, sand-sized materials, aggregate, and binding agents.

The invention also relates to a capping product for capping and treating a metal-contaminated sediment. The capping product comprises a plurality of manufactured composite particles, each composite particle comprising a relatively dense core and a sealant layer at least partially encapsulating the core. The sealant layer is capable of absorbing water and swelling to form a layer on the sediment. The sealant layer contains sulfur and at least one component selected from the group consisting of clays, clay-sized materials, bulking agents, sand, sand-sized materials, and binding agents.

The invention also relates to a capping product and a metal-contaminated sediment. The capping product caps and treats the sediment. The capping product contains sulfur and at least one component selected from the group consisting of clays, clay-sized materials, bulking agents, sand, sand-sized materials, aggregate, and binding agents.

Various objects and advantages of the invention will become readily apparent to those skilled in the art from the following detailed description of preferred embodiments.

DETAILED DESCRIPTION OF THE PREFERRED EMBODIMENTS

The treatment method of the invention uses a sulfur-bearing capping product for the effective in situ capping and treatment of a metal-contaminated sediment. The product is designed to primarily treat (sequester) sediment-borne heavy metals such as lead, copper, zinc, mercury, etc. Any type of metal-contaminated sediment can be treated, including sediments occurring within deepwater, wetland, or periodically inundated environments characterized by freshwater or saline (including brackish) conditions.

Upon product placement, sediment treatment is effected, and metals are sequestered, through the formation of relatively insoluble metal-sulfide complexes, which minimize the potential for contact between such metals and lower-order members of the aquatic food chain, including benthic organisms. Such metal-sulfide complexes are typically formed (precipitated) as dissolved, sediment-borne metals migrate from a contaminated sediment body upwards into the base of the sulfur-bearing capping product. The relatively chemically reduced conditions that often characterize many even non-contaminated sediment environments are conducive to and may promote the formation and stability of chemically reduced forms of sulfur (i.e. sulfides) and therefore, in turn, promote the formation and stability of metal-sulfide complexes, thus facilitating the effectiveness of the sulfur-bearing capping product.

The sulfur for use in the capping product can be elemental sulfur, or any type of sulfur derivative (e.g., a sulfide) or other sulfur-containing compound that is effective for the treatment of the metal-contaminated sediment. The sulfur can be in any form, such as powdered, granular, or pelletized form.

In addition to the sulfur, the capping product also contains at least one component selected from clays, clay-sized materials, bulking agents, sand, sand-sized materials, aggregate, and binding agents. The components of the capping product are effective to form a cap on the metal-contaminated sediment. The relative quantities of components in the product will depend upon specific project needs and goals.

The clay is a clay mineral or a mixture of clay minerals. Preferably, the clay is a dry clay mineral that exhibits a high absorption and swelling capacity upon hydration. Some examples of suitable dry clay minerals include montmorillonite (key clay mineral component of bentonite), illite, kaolinite, and attapulgite (palygorskite) clays. Preferably, the clay mineral is a montmorillonite clay which is readily hydratable, such as would occur in sodium bentonite or calcium bentonite material. A dry clay mineral is composed of negatively charged, extremely small clay mineral particles that have a very large ratio of surface area to mass. These properties make the clay mineral hydrate readily when exposed to water, expanding into a cohesive, plastic soil mass with a relatively low permeability to water. As a result of its properties, the clay mineral reduces the overall permeability of the capping product to water, thereby reducing metal migration rates, maximizing contact/reaction times between the metal and the sulfur, and helping to promote the formation and stability of metal-sulfide complexes. The low-permeability nature of the capping material would also reduce the rate and extent of the diffusion of dissolved oxygen into the cap, thereby also promoting and facilitating chemically reduced conditions and metal-sulfide complex stability as well.

As an additional mitigating factor, some clay minerals, such as montmorillonite, have a particularly high and negatively charged surface area which also promotes attenuation of metal ions onto such charged surfaces (in addition to the formation of metal-sulfide complexes).

The clay-sized material is a material having an average particle size of less than about 10 microns, typically less than about 5 microns, and sometimes less than about 2 microns. Some examples of suitable materials include organophylic bentonite ("organo clays"); zeolites; inorganic oxides of aluminum, iron, and/or manganese; humic substances; and/or activated carbon.

The bulking agent can be any material that adds bulk to the capping product and that contributes to, or is compatible with, the formation of a cap on the contaminated sediment. Some examples of suitable bulking agents include gypsum, gypsum fines, Portland cement, cement kiln dust, lime dust, stone dust, fly ash, and plaster of Paris. These bulking agents in combination with the clay can create a more hardened cap on the contaminated sediment.

The sand is silica sand or any loose, granular particles of worn or disintegrated rock. The sand-sized material is a material having a particle size within the range of from about 0.05 to about 2 millimeters.

Some examples of suitable aggregate for use in the capping product include pieces of rock or stone, such as gravel, iron ore, slag, glass cullet, crushed glass or crushed porcelain.

The binding agent is preferably a polymeric material, such as a cellulosic polymer. A preferred cellulosic polymer is guar gum. Other preferred cellulosic polymers include hydroxyethyl cellulose polymer and carboxymethyl cellulose polymer. Other suitable binders include glues, lignites (sap), starch grafted polyacrylates, and soybean oil lecithins and their derivatives.

The sulfur-bearing capping product of the invention may comprise a variety of general physical configurations, including: (a) a relatively discrete-particle, AQUABLOK-type product, which includes sulfur as a component of the sealant layer; or (b) a relatively non-descript, amalgamated "mass" of material containing sulfur plus one or more of the aforementioned components, with or without aggregate comprising one of the components. The AQUABLOK product is described in the following patents, all of which are incorporated by reference herein: U.S. Pat. No. 5,538,787 issued Jul. 23, 1996; U.S. Pat. No. 5,897,946 issued Apr. 27, 1999; U.S. Pat. No. 6,386,796 issued May 14, 2002; and U.S. Pat. No. 6,558,081 issued May 6, 2003. When the capping product is an AQUABLOK-type product, it comprises a plurality of manufactured composite particles, each composite particle comprising a relatively dense core and a sealant layer at least partially encapsulating the core, the sealant layer being capable of absorbing water and swelling to form a layer on the sediment, the sealant layer containing sulfur and at least one component selected from the group consisting of clays, clay-sized materials, bulking agents, sand, sand-sized materials, and binding agents.

Due to its relatively dense nature in dry (pre-hydrated) form, it is envisioned that the sulfur-bearing capping product, in any configuration, may be applied across either an inundated or non-inundated, metal-contaminated sediment surface.

The principle and mode of operation of this invention have been described in its preferred embodiments. However, it should be noted that this invention may be practiced otherwise than as specifically illustrated and described without departing from its scope.

What is claimed is:

1. A capping product for capping and treating a metal-contaminated sediment comprising a plurality of manufactured composite particles, each composite particle comprising a relatively dense core and a sealant layer at least partially encapsulating the core, the sealant layer being capable of absorbing water and swelling to form a layer on the sediment, the sealant layer containing sulfur in the form of elemental sulfur or a sulfide and at least one component selected from the group consisting of clays, clay-sized materials, bulking agents, sand, sand-sized materials, and binding agents.

2. A capping product according to claim 1 wherein the sealant layer contains bentonite.

3. A capping product for capping and treating a metal-contaminated sediment comprising a plurality of manufactured composite particles, each composite particle comprising a relatively dense core and a sealant layer at least partially encapsulating the core, the sealant layer being capable of absorbing water and swelling to form a layer on the sediment, the sealant layer containing sulfur in a form that is effective to sequester metals and at least one component selected from the group consisting of clays, clay-sized materials, bulking agents, sand, sand-sized materials, and binding agents.

4. A capping product according to claim 3 wherein the sulfur is in a form that is effective to sequester metals under water.

5. A capping product for capping and treating a metal-contaminated sediment comprising a plurality of manufactured composite particles, each composite particle comprising a relatively dense core and a sealant layer at least partially encapsulating the core, the sealant layer being capable of absorbing water and swelling to form a layer on the sediment, the sealant layer comprising clay, gypsum and sulfur.

* * * * *